US006873893B1

United States Patent
Sanghera et al.

(10) Patent No.: US 6,873,893 B1
(45) Date of Patent: Mar. 29, 2005

(54) MISSILE WARNING AND PROTECTION SYSTEM FOR AIRCRAFT PLATFORMS

(75) Inventors: Jasbinder Sanghera, Ashburn, VA (US); Lynda Busse, Alexandria, VA (US); Ishwar Aggarwal, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/632,211

(22) Filed: Aug. 1, 2003

(51) Int. Cl.[7] .............................................. G05D 3/00
(52) U.S. Cl. ................................................ 701/49; 701/1
(58) Field of Search ................................................ 701/49

(56) References Cited

FOREIGN PATENT DOCUMENTS

IT          0 680 767 A1 * 11/1995    ............ A61M/5/32

* cited by examiner

Primary Examiner—Yonel Beaulieu
(74) Attorney, Agent, or Firm—John J. Karasek; George A. Kap

(57) ABSTRACT

This invention pertains to a jam head and to a protection system. The jam head is rotatable around at least two separate axes and includes a first part rotatable around a first axis and a second part rotatably connected to the first part and rotatable around a second axis; a viewing port in the first part for viewing an object; at least one reflecting surface for conveying an image through the port; a camera optically connected via the at least one reflecting surface to the port; and a unitary infrared transmitting glass fiber of constant core diameter passing from the laser to and through the first and the second parts for conveying an energetic infrared optical signal and an exit port through which the optical signal passes. The protection system is mounted on a movable platform and includes a detector for locating a threat; an electronic and control system connected to the detector for receiving a signal from the detector; a laser connected to the electronic and control system; and the jam head.

24 Claims, 4 Drawing Sheets

MISSILE WARNING AND PROTECTION SYSTEM FOR AIRCRAFT PLATFORMS

BACKGROUND OF THE INVENTION

1. Field of the Invention

This invention pertains to the use of a unitary glass fiber in an infrared counter measure system in connection with an infrared seeking missile threat to convey a high power optical signal from a laser to a guidance system in order to break lock of the missile threat to the target that is a movable platform.

2. Description of Related Art

Anti-aircraft missiles can be categorized in two categories: active and passive. Missiles with active guidance are guided by external signals, which can be in the from of a radar on the missile, or guided by guidance information sent by the launching plane or ground launcher. Missiles with passive guidance are guided by signals given off by the plane or another target they are tracking. For example, a Sidewinder missile tracks the heat (infrared energy) of exhaust of the target.

This invention pertains to the use of a unitary infrared transmitting glass fiber from a laser to and within a jam head and in a missile protection system against a passively guided missile to convey a disabling optical signal to the missile in order to neutralize its objective.

The article in the publication "NRL Review" for September 2000 discloses the use of segmental glass fibers in a jam head of an infrared counter measure system. The article discloses that the IR-transmitting optical fibers are a natural choice for a compact low-cost optical device from the laser to the jam head. The article discloses the use of chalcogenide glasses, such as arsenic sulphide, which transmit in the 2–5 micron wavelength region. FIG. 8 of the article shows the use of three segmental glass fibers in and leading to the jam head. With an optical loss of 17% per face and 31% per rotary joint causes degradation in the signal that is intended to be transmitted to the IR guidance system of the threat missile.

OBJECTS AND BRIEF SUMMARY OF THE INVENTION

It is an object of this invention to use a continuous glass infrared transmitting fiber from a laser to and through a jam head or any other beam pointing device, in an infrared countermeasure system.

It is another object of this invention to use a continuous glass fiber as the optical link from a laser to and through a jam head to deliver an optical signal to an incoming infrared guided missile.

It is another object of this invention to use a low cost, lightweight, compact and continuous optical link between a light source and a beam pointing device in an infrared countermeasure system.

Another object of this invention is the use of a continuous glass fiber to convey a high power optical signal in the peak power density range 1–400 $GW/cm^2$ in an infrared countermeasure system.

Another object of this invention is the use of a unitary optical glass fiber between a laser and a jam head that has a constant core cross-section.

Another object of this invention is the use of a continuous glass fiber having transmission loss of less than 1 dB/m.

These and other objects of this invention can be attained by an infrared countermeasure system mounted on a moving platform in which the system is characterized by the use of a unitary glass fiber to convey a disabling optical signal from a laser to and through a jam head mounted on the moving platform.

DETAILED DESCRIPTION OF THE INVENTION

This invention pertains to an infrared countermeasure system deployed against an infrared guided missile.

Figure 1:
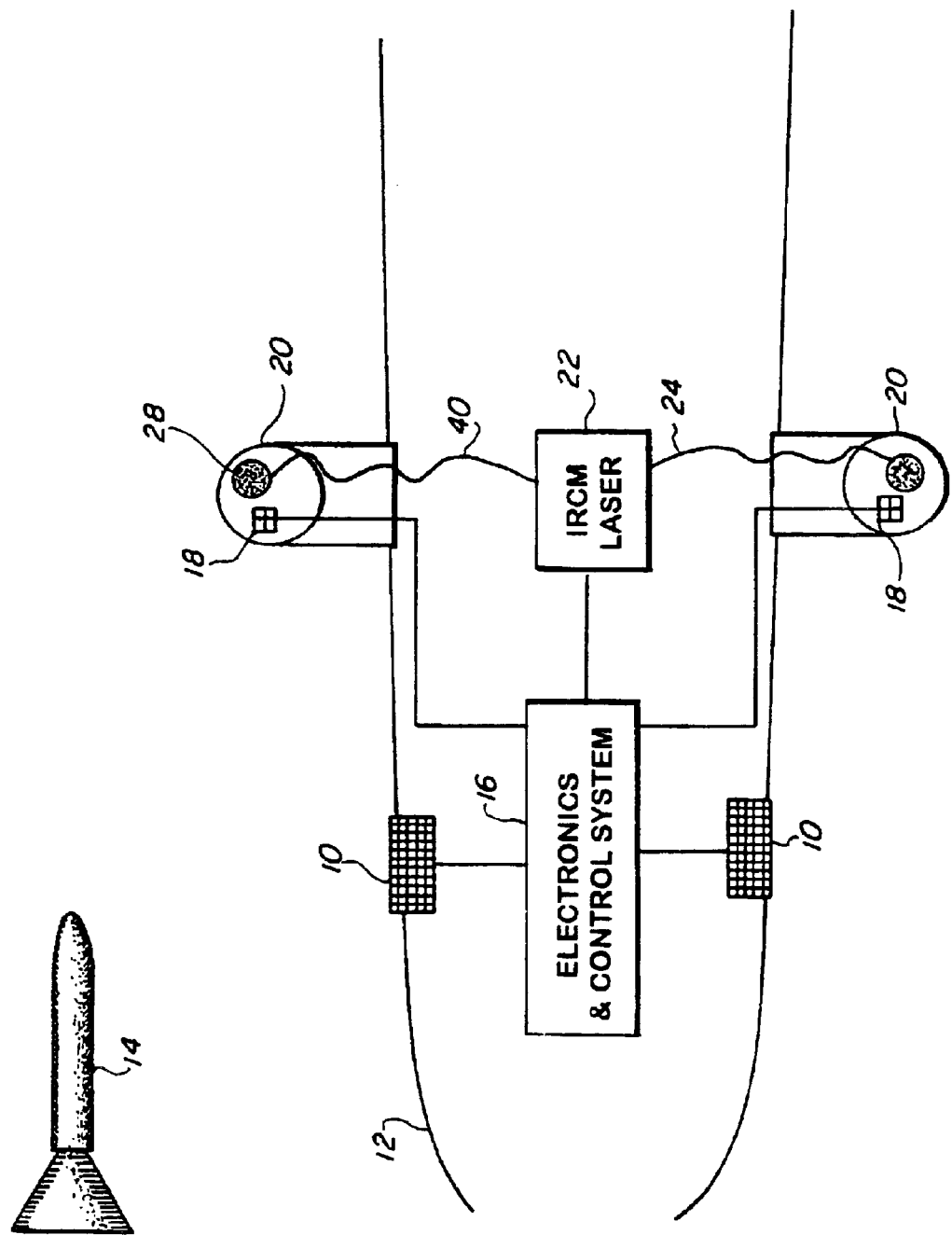
FIG. 1 is a schematic illustration showing an infrared guided missile and an infrared countermeasure system mounted on a plane.

When an IR guided missile is launched at an aircraft, response to the threat must occur automatically within a few seconds or less, and so a sequence of events is triggered quickly, as demonstrated using the schematic illustration of the system shown in FIG. 1. Firstly, IR detector 10, of which there can be more than one, disposed on aircraft platform 12 locates missile 14 based on its characteristic IR signature in the 2–5 micron wavelength region, or any other wavelength region, and relays it to electronic and control system 16. Detector 10 typically operates in the regions of 2–5 microns and/or 8–12 microns. Location of the missile 14 is relayed by electronic and control system 16 to tracking sensor 18, of which there can be more than one, mounted on jam head 20, of which there can be more than one. Once location of the missile is passed on to tracking sensor 18, the tracking sensor locks onto the missile and maintains dynamic alignment of the jam head with the missile. When missile 14 has been located by detector 10, a signal from the detector is also conveyed to electronic and control center 16 and then to laser 22 which reacts to the signal and emits a highly energized modulated pulse through glass fiber 40 to output aperture 28 in the jam head from where it is directed at the infrared control sensors on the missile. The pulsed laser signal from the jam head disables the missile control system with the result that the missile's lock on the platform is broken and the missile veers off course thus saving the platform from catastrophe.

Prior to the detector 10 locking on missile 14, the signal from the missile is subjected to discriminating sensors which determine whether object 14 is a threat to the moving platform 12. It is after this discriminating step that detector 10 locks onto object 14 if the object is a threat.

Figure 2:
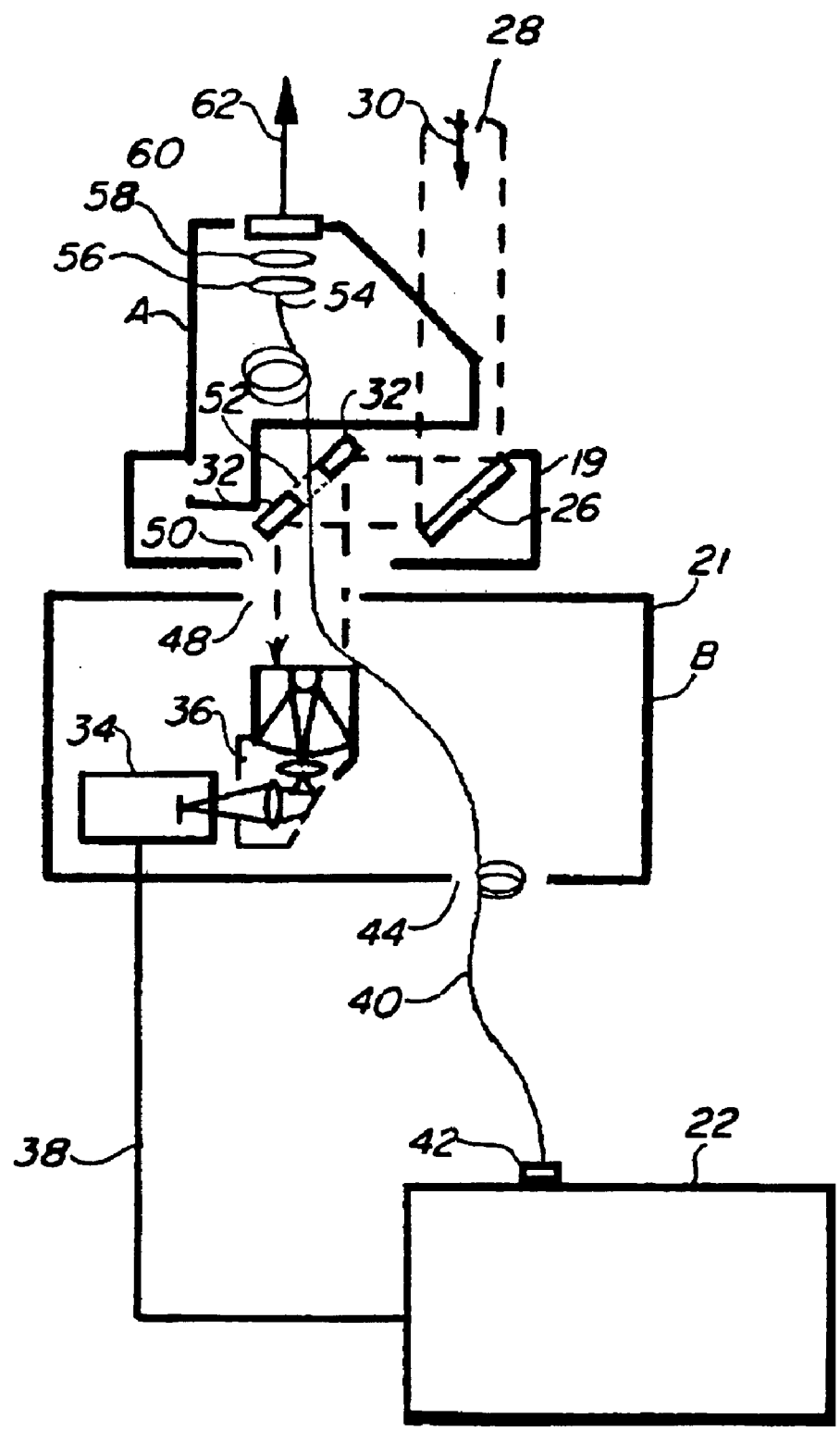
FIG. 2 is a schematic illustration of the jam head showing the two separately movable parts.

FIG. 2 illustrates the action of jam head 20 in greater detail. The jam head is composed of connected but independently rotating elevation axis part 19 and azimuthal part 21. The azimuthal axis part rotates in the XY plane around the Z axis through typically 360°, or another angular extent, and the elevation axis part rotates relative to the Z axis through angular rotation of typically +90'/−135', or through another angular extent. The azimuthal axis part can rotate through an angle of typically up to about 360° and when it reaches the full angular extent, it can reverse and rotate in the opposite direction through up to about 360°. The elevation axis jam head part acts similarly to the azimuthal axis part but it rotates typically 90° in one direction, reverses its rotation and rotates typically 135° in the opposite direction. Together, the elevation axis and the azimuthal parts of one or more of the jam heads enable the protection system to scan all around the moving platform and provide protection from infrared seeking threats.

It is not the function of the jam head to locate a threat. Function of the jam head is to receive direction from the control system to lock on to the threat and convey an energetic optical signal to the threat in order to disorient the threat so that it does not hone in on the movable platform.

Referring again to FIG. 2, elevation axis part 19 contains mirror 26 disposed at an angle from the horizontal, typically 45°, and an output aperture 28 through which image 30 from the threat missile enters. Mirror 32, with an opening 52 in it, is disposed to the left of mirror 26 (only in this figure but in reality it can be at alternative positions) which is also disposed at an angle to the horizontal, typically 45°, so that the image of the threat is reflected between mirrors 26,32 and collected by camera 34 after passing through its associated optics structure 36 in azimuthal part 21. The camera can be located in either part. Line 38 between camera 34 and laser 22 signifies a signal between the camera and the laser and is used to trigger the laser. A unitary infrared transmitting glass fiber 40 of constant core diameter is connected to laser 22 at point 42, threads through azimuthal part 21 of the jam head through lower azimuthal opening 44 and then through upper azimuthal opening 48, then through the lower elevation axis opening 50 into elevation axis part 19 of the jam head where it goes through opening 52 in mirror 32 and to a point 54. Alternatively, mirror 32 may be solid and fiber 40 can pass next to it within the elevation axis part. The energetic optical signal delivered through the glass fiber diverges as soon as it leaves the fiber so it is collimated by lenses 56,58 and leaves the elevation axis part of the jam head through laser aperture 60 to deliver a jamming signal 62 to the missile threat 14. Glass fiber 40 is typically encapsulated in a rugged and durable cable with appropriate connections at the end-faces.

As shown in FIG. 2, glass fiber 40 extends from laser 22 into azimuthal part 21 of the jam head through lower opening 44, by-passes optical structure 36 of optical camera 34 and out of the azimuthal part through upper opening 48 and into the elevation axis part 19 of the jam head through lower opening 50 then through opening 52 in mirror 32 (or next to mirror 32) and then to point 54 before the signal is passed through collimating lenses 56,58 and then through laser aperture 60 as the energetic optical signal 62 is directed at a threatening missile.

Since the elevation axis part 19 and azimuthal part 21 of the jam head rotate in different planes, individual means should be provided to accommodate the excess glass fiber to allow for the rotation of each independent jam head part. Although the term "rotation" has been used in connection with independent movement of each jam head part, it should be understood that the movement is limited rotation through an angle typically 360° or less and that the rotation is not continuous but a scanning of the atmosphere by back and forth swiveling of the jam head parts. This is significant since only a predetermined excess of the fiber is necessary to provide for the limited rotation of the jam head parts.

Figures 3A, 3B:
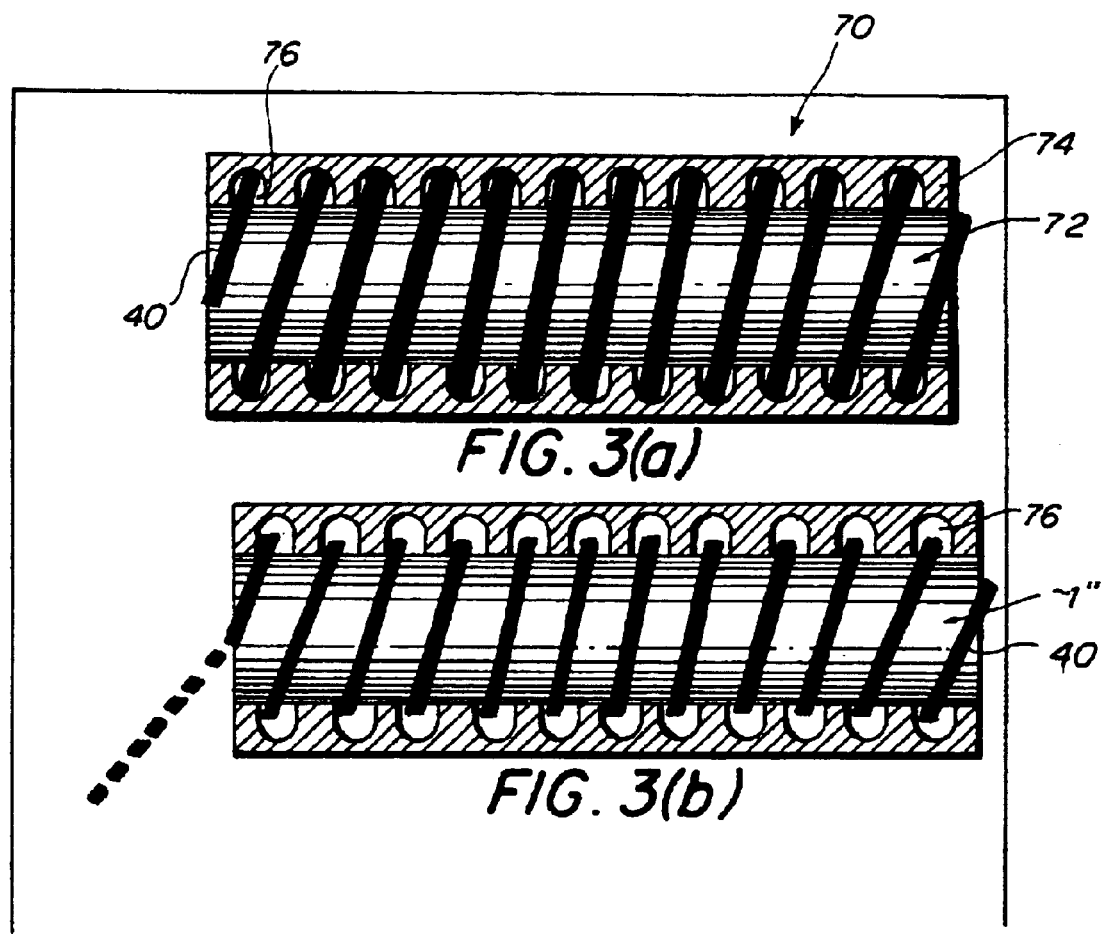
FIG. 3 is a cross-sectional view of the spool device which shows the glass fiber in either a loose or slack condition (FIG. 3a), wherein the fiber is shown disposed away from the mandrel, or a taut condition (FIG. 3b), wherein the fiber is disposed against the mandrel.

FIGS. 3(a) and 3(b) illustrate the spool structure 70 which provides for storage of the fiber coil or cable when needed.

More than one spool structure can be used, typically one for each separately rotating part. Spool structure 70 includes mandrel 72 with a plurality of stanchions or bars 74 disposed on the mandrel periphery at desired intervals. Four of the bars spaced 90° apart are typically disposed on the outside of the mandrel. Each bar 74 is provided with spaced open slots 76 disposed at the bar edge in contact with the mandrel. The slots are typically evenly spaced at the edge of each bar and should be larger than diameter of the glass fiber to accommodate any slack therein due to the individual rotation of the parts in the jam head. Although any number of spool structures can be provided for the moving parts of a jam head, typically individual spool structures are provided for elevation axis part 19 and azimuthal part 21. In the jam head embodiment of FIG. 2, one spool structure is provided at opening 44 or inside of the azimuthal part 21, not shown, and another spool structure is provided at opening 50 or inside elevation axis part 19 (not shown). FIG. 3(a) shows the spool structure 70 with glass fiber 40 loosely wrapped around and disposed on mandrel 72 passing through open slot 76 of bars 74, the fiber being loosely wrapped around the mandrel with slack fiber being in the slots where the fiber is disposed against the upper reaches of the slots. It does not have to be at the upper reaches of the slots, but instead could be part way. FIG. 3(b) shows the spool structure 70 tightly wrapped around the mandrel passing through open slots 76 of bars 74, the fiber being tightly wrapped around the mandrel with the fiber having no slack and disposed around the mandrel, leaving most of each open slot vacant. In short, FIG. 3(a) shows a relaxed glass fiber in a spool structure with the fiber slack stored whereas FIG. 3(b) shows a taut glass fiber in a spool structure with the fiber slack utilized for rotation.

In a particular embodiment of the spool structure illustrated in FIGS. 3(a) and 3(b), mandrel outside diameter was 1⅝", mandrel and bar length were 3½", bar thickness was ⅛" with four bars spaced axially every 90° along the mandrel periphery, and the open slots were 9/32×5/16 of an inch spaced every 11/32 of an inch along the bar edges. It should be understood that dimensions of the spool structure are a matter of choice and depends on the angular rotation needed for the spool such that its design and that other dimensions can be used by persons skilled in the art.

Figure 4:
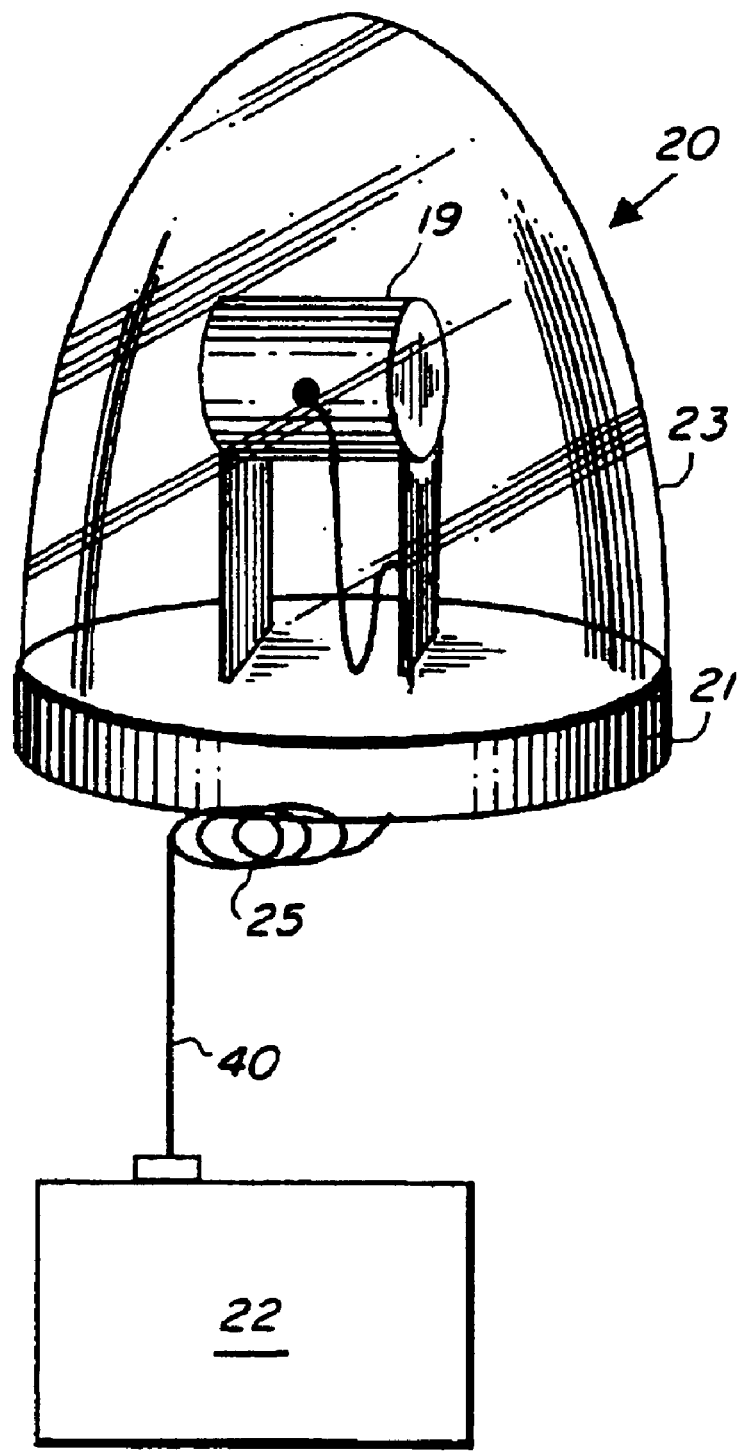
FIG. 4 shows another embodiment of the jam head.

FIG. 4 is another embodiment of jam head 20 that is disposed on movable platform, such as a plane or a ship. The jam head includes elevation axis part 19 located on azimuthal part 21 with glass fiber 40 threaded through the two jam head parts. Jam head cover 23 is IR transparent. Spool structure 70 can be provided at point 25, or at any other desirable location, to accommodate slack of the fiber during rotation of the rotating parts of the jam head. The tracking sensors and electronics are not shown.

To assure suitability of the fibers for use in a jam head which is subjected to multidirectional flexing, five glass fibers were subjected to a test whereby each fiber was repeatedly flexed on a mandrel 4 cm. in outside diameter. The core of the fibers was $As_{39}S_{61}$ at 165 microns in diameter and the cladding was $As_{40}S_{60}$ at 230 microns in outside diameter. The fibers had a transmission loss of 0.8 dB/m and went through more than 20,000 of flexing cycles of tightening and relaxation, without breaking or change in optical loss, indicating suitability for use in the jam head described and illustrated herein.

Solid core glass fibers can convey an optical signal of at least about 4 $GW/cm^2$ peak power density without catastrophic destruction of the glass. The solid core glass fibers are generally used for transmission of optical signals of lower power, up to and including 4 $GW/cm^2$.

In addition to suitable solid core glass fibers, hollow core fibers can also be used, such as the photonic band gap infrared glass fibers. Such fibers are typically referred to as optical chalcogenide glass fibers that have a central axial opening for passing an optical signal, an axial microstructured region disposed around the opening and a solid axial region disposed around the microstructured region for providing structural integrity to the microstructured region. The hollow core fibers have outer diameter of 80–1000 microns, the central opening is from about 1 to several hundred of microns in diameter, and the microstructured region is 5–500 microns thick and comprises of a plurality of axial openings arranged in typically 4–5 courses with the openings spaced from each other 1–12 microns. In the microstructured region, air fill fraction should be 30–90%. The purpose of the opening in the microstructured region is to create a photonic band gap which channels and retains light in the hollow core.

Solid core glass fibers and hollow core photonic band gap glass fibers are made from chalcogenide glass. Chalcogenide glass is a vitreous material composed of the chalcogen elements of Group VI of the Periodic Table. These elements are usually mixed with elements of Groups IV and V to form the familiar compound glasses. More particularly, chalcogenide glasses are made from mixtures containing at least one of sulfur, selenium, and tellurium. Other elements can be added. Examples of other elements that can be combined with at least one chalcogen element include germanium, arsenic, and antimony.

Chalcogenide glass typically contains at least about 25 mole percent, and generally at least 50 mole percent, of one or more of the three chalcogen elements. The presence of tellurium in the glass composition has been found to allow transmission at longer wavelengths in the infrared region. While sulphide fibers, such as $As_2S_3$, transmit from about 1–6 microns, the transmission window is increased to beyond 10 microns by including the heavier chalcogenide element tellurium. Glasses containing high levels of tellurium typically transmit in the 3–12 micron region.

The use of chalcogenide fibers is advantageous not only for wide transmittance range but also for chemical durability. Although chalcogenide glass cannot be used in strongly basic environment because it undergoes chemical attack, there are numerous environments where chalcogenide fibers can be used. For instance, chalcogenide glass does not react with water, unlike fluoride glass, and can, therefore, be used in aqueous environments. Additionally, chalcogenide glass can be used in acidic and organic environments.

The solid and hollow core fibers can also be made from mixtures of halide and chalcogenide glass components and are called chalcohalide glasses. Chalcohalide glasses, such as approximately 40/60 mixtures of arsenic and sulfur with about 5% of a halide, such as iodine, bromine, chlorine or fluorine, have relatively poor chemical durability and low glass transition temperatures whereas chalcogenide glasses are well known for their chemical durability but their relatively high rafractive indices give rise to high reflectivities from the glass surface. Chalcohalides have some beneficial characteristics of both glasses. The structural aspect of these glasses is interesting from a fundamental viewpoint since chalcogenide glasses are predominantly covalent and halide glasses are predominantly ionic in character. As used herein, the term "chalcogenide" includes "chalcohalide."

The solid core and photonic band gap hollow core fibers can have a polymeric material cladding (jacketing) or a cladding of any other material, on the outside of the fiber, although such cladding is optional. The cladding is provided on the fiber to facilitate handling thereof. Although the cladding material can be hydrophobic or hydrophilic, typically it is hydrophobic for obvious reasons.

An example of a specific hollow core photonic band gap fiber is one fabricated from $As\ S_{39}S_{61}$ glass, having outside diameter of about 150 microns, hollow core of about 10 microns in diameter, a microstructured region around the hollow core of about 15 microns in thickness with air fill fraction of about 60% composed of a plurality of axial openings of about 3 microns in diameter arranged in 5 courses around the hollow core. The solid region disposed around the microstructured region is about 55 microns thick.

The hollow core photonic band gap fibers can be used for low and ultrahigh power applications. Because of the central opening through which an optical signal can travel, it is estimated that peak power density that the hollow core fiber can carry is at least 400 $GW/cm^2$ without catastrophic destruction of the glass.

In previous art, the jam head contains a series of mirrors and optical components to guide the laser beam to and through the jam head. to the exit aperture. The bulk optics within the jam head must be movable by means of a control system to keep the optics aligned during platform vibrations. There are also multiple position sensing detectors and feedback loops within the jam head to keep the optics aligned. By using a single fiber to transmit the laser beam from the laser to and through the jam head, all of these optics, detectors and feedback loops can be removed, resulting in robust alignment as well as considerable reduction in weight as well as manufacturing and maintenance costs.

The use of a unitary glass fiber to transmit an energetic optical signal to a threatening missile produces surprising and unexpected results. In the case of segmental fibers used in prior art protection devices, each fiber-to-fiber connection in a rotary joint yields an optical transmission loss of 17% per face or about 31% per joint. Therefore, even if one or two fiber joints are used, transmission loss would be more than substantial, thus limiting effectiveness of the protection device. Furthermore, every time a rotary joint is used to join a pair of fibers, there is a natural divergence of the optical signal which has to be accommodated by increasing the solid core of the fiber. In one example where three fiber segments were used, the core of the fibers was progressively increased from 150 microns to 250 microns. The use of a unitary fiber removes this problem and the accompanying considerations.

While presently preferred embodiments have been shown of the missile warning and protection system, and of the several modification discussed, persons skilled in this art will readily appreciate that various additional changes and modifications can be made without departing from the spirit of the invention as defined and differentiated by the following claims.

What is claimed is:

1. In a jam head rotatable around at least two separate axes comprising a first part rotatable around a first axis and a second part rotatably connected to said first part and rotatable around a second axis, a viewing port in said first part for viewing an object, at least one reflecting surface for conveying an image through said port, a camera optically connected via said at least one reflecting surface to said port, the improvement comprising a unitary infrared transmitting glass fiber of constant core diameter passing from the laser to and through said first and said second parts for conveying an energetic infrared optical signal and an exit port through which the optical signal passes.

2. The jam head of claim 1 including at least one spool structure associated with said jam head for storing slack in said fiber in response to the rotary action of at least one of said parts.

3. The jam head of claim 2 including at least one collimating lens in said first part connected to said fiber for collimating the signal passing through said fiber and a tracking sensor mounted on said jam head.

4. The jam head of claim 3 wherein said at least one reflective surface is disposed in said first part, said camera is located in said second part and said tracking sensor is mounted on said first part.

5. The jam head of claim 4 wherein one spool structure is secured to said first part and accommodates storage of fiber slack caused by rotation of said first part and wherein a second spool structure is secured to said second part and accommodates storage of fiber slack caused by rotation of said second part.

6. The jam head of claim 4 wherein said at least one reflecting surface comprises two spaced optically connected mirrors for conveying an image of the object from said viewing port to said camera.

7. The jam head of claim 6 including a connection on said camera for conveying a signal outside of said part.

8. The jam head of claim 7 including a transparent dome which serves as said viewing port.

9. The jam head of claims 7 including a laser aperture in said first part disposed in proximity to said collimating lens through which passes the energetic optical signal from said fiber.

10. The jam head of claim 9 wherein said fiber has optical transmission loss of less than about 0.8 dB/m, is a solid core fiber with the core being $As_{39}S_{61}$ glass and the clad being $As_{38}S_{62}$ glass.

11. The jam head of claim 9 wherein said fiber has optical transmission of less than about 0.8 dB/m.

12. The jam head of claim 11 wherein said fiber is a photonic band gap hollow core fiber comprising an axial hollow core 2–200 microns in diameter, an axial microstructured region 5–500 microns thick, and a solid axial region 5–500 microns thick around and in contact with said microstructured region; the microstructured region has air fill fraction of 30–90% and comprises a plurality of axial openings from a fraction of a micron to 10 microns in diameter with a center-to-center spacing of 1–12 microns arranged in 4–5 courses around the hollow core in a hexagonal pattern.

13. A protection system mounted on a movable platform comprising a detector for locating a threat; an electronic and control system connected to said detector for receiving a signal from said detector; a laser connected to said electronic and control system; and a jam head including at least two independently rotatable parts and a tracking scanner connected to said laser and to said electronic and control system for sending a laser burst at the threat in order to disable/disorient same, said jam head comprising a unitary glass fiber of constant core diameter passing through said first and said second parts for conveying an energetic optical signal and an exit port through which the optical signal passes.

14. The protection system of claim 13 including in said jam head at least one spool structure associated with said jam head for storing slack in said fiber in response to the rotary action of at least one of said parts.

15. The protection system of claim 14 including in said jam head at least one collimating lens in said first part connected to said fiber for collimating the signal passing through said fiber.

16. The protection system of claim 15 wherein said at least one reflective surface is disposed in said first part and said camera is located in said second part.

17. The protection system of claim 16 wherein one spool structure is secured to said first part and accommodates storage of fiber slack caused by rotation of said first part and wherein a second spool structure is secured to said second part and accommodates storage of fiber slack caused by rotation of said second part.

18. The protection system of claim 17 wherein said at least one reflecting surface comprises two spaced optically connected mirrors for conveying an image of the object from said viewing port to said camera.

19. The protection of claim 18 including a connection on said camera for connecting a signal outside of said part.

20. The protection system of claim 19 including a transparent dome which serves as said viewing port.

21. The protection system of claim 18 including a laser aperture in said first part disposed in proximity to said collimating lens through which passes the energetic optical signal from said fiber.

22. The protection system of claim 21 wherein said fiber has optical transmission loss of less than about 0.8 dB/m, is a solid core fiber with the core being $As_{39}S_{61}$ glass and the clad being $As_{38}S_{62}$ glass.

23. The protection system of claim 21 wherein said fiber has optical transmission of less than about 0.8 dB/m.

24. The protection system of claim 21 wherein said fiber is a photonic band gap hollow core fiber comprising an axial hollow core 2–200 microns in diameter, an axial microstructured region about 15 microns thick, and a solid axial region 5–500 microns thick around and in contact with said microstructured region; the microstructured region has air fill fraction of 30–90% and comprises a plurality of axial openings from a fraction of a micron to 10 microns in diameter with a center-to-center spacing of 1–12 microns arranged in 4–5 courses around the hollow core in a hexagonal pattern.

* * * * *